United States Patent [19]
Siler

[11] Patent Number: 6,067,476
[45] Date of Patent: May 23, 2000

[54] APPARATUS AND METHOD TO DETECT TAMPERING WITH FUEL DISPENSER TOTALIZER

[75] Inventor: Benjamin T. Siler, Stokesdale, N.C.

[73] Assignee: Gilbarco Inc., Greensboro, N.C.

[21] Appl. No.: 08/960,712

[22] Filed: Oct. 30, 1997

[51] Int. Cl.[7] .................................................. G05B 9/02
[52] U.S. Cl. .............................. 700/79; 700/80; 700/236; 700/237; 700/240; 705/416; 705/16; 705/28; 340/637
[58] Field of Search ..................... 340/637; 700/231–241, 700/79, 80, 177, 178, 179; 705/416, 16, 26, 28

[56] References Cited

U.S. PATENT DOCUMENTS

| | | |
|---|---|---|
| 3,030,015 | 4/1962 | Weislander et al. . |
| 3,231,135 | 1/1966 | Starbuck et al. . |
| 3,344,986 | 10/1967 | Stasenko et al. . |
| 3,697,981 | 10/1972 | Harkins et al. ......................... 340/359 |
| 3,701,994 | 10/1972 | Bateman ................................... 346/43 |
| 3,931,497 | 1/1976 | Gentile et al. ......................... 235/61.7 |
| 3,943,500 | 3/1976 | Buchanan .............................. 340/253 R |
| 4,097,724 | 6/1978 | Roberson .................................. 235/92 |
| 4,319,128 | 3/1982 | Dow, Jr. et al. .......................... 235/61 |
| 4,589,069 | 5/1986 | Endo et al. .............................. 364/405 |
| 5,154,314 | 10/1992 | Van Wormer ............................... 222/1 |
| 5,319,545 | 6/1994 | McGarvey et al. ...................... 364/403 |
| 5,550,532 | 8/1996 | Marshall ................................. 340/604 |
| 5,842,188 | 11/1998 | Ramsey et al. .......................... 705/416 |
| 5,895,457 | 4/1999 | Kurowski et al. ....................... 705/413 |
| 5,898,387 | 4/1999 | Davis et al. ......................... 340/870.02 |
| 5,910,774 | 6/1999 | Capriotti et al. ........................ 340/637 |
| 5,914,673 | 6/1999 | Jennings et al. .................... 340/870.03 |
| 5,915,932 | 6/1999 | Nabity et al. ......................... 417/477.1 |

*Primary Examiner*—Paul P. Gordon
*Assistant Examiner*—Romesh Patel
*Attorney, Agent, or Firm*—Coats & Bennett, P.L.L.C.

[57] ABSTRACT

Apparatus to detect tampering with a totalizing device on a fuel dispenser with a totalizing device acting to keep a running total of fuel dispensed from the fuel dispenser and including an electric circuit containing at least one coil that will emit a magnetic pulse responsive to a condition consistent with proper totalizer operation, the apparatus including an arrangement for sensing the presence of the magnetic pulse and generating a signal responsive thereto and an arrangement for causing an alarm responsive to absence of the magnetic pulse.

29 Claims, 6 Drawing Sheets

APPARATUS AND METHOD TO DETECT TAMPERING WITH FUEL DISPENSER TOTALIZER

BACKGROUND OF THE INVENTION

The present invention relates broadly to security apparatus for dispensing devices and, more particularly, to an electrical circuit to detect tampering with a fuel dispenser totalizer and a method associated therewith.

Liquid fuel, such as gasoline, is a fungible, flowable material, which is usually transferred between several differently sized vessels in varying amounts prior to its ultimate use. Accordingly, accurate measurements of the quantity of fuel transferred are a requirement for proper inventory control. Fuel dispensers control and meter the flow of fuel therefrom and account for each unit dispensed. Fuel, particularly gasoline and diesel fuel, dispensed from commercial outlets is stored in underground tanks which are periodically replenished as fuel is drained therefrom. Therefore, not only do individual purchases have to be totaled, a running total of fuel dispensed from any given dispenser must be maintained. Therefore, a "totalizer" is used to keep such a running total of fuel dispensed. The totalizer is typically an electromechanical device that uses a solenoid to advance a mechanical counter one increment for each unit of fuel dispensed. All the individual station owners monitor their sales through individual sales, the fuel distributor must monitor the running total to maintain an accurate assessment of fuel dispensed.

Situations can arise where less than honest individuals can disable the totalizer, indicating that less fuel was moved through the dispenser than was actually dispensed, resulting in fraudulent operation, and a loss to the fuel supplier. As may be expected, if the totalizer indicates that less fuel was dispensed than was actually dispensed, whomever is operating the pump will realize an unfair profit. Further, the totalizers must be depended on for accurate dispensing information for billing and predictions of future fuel requirements.

Figure 1:
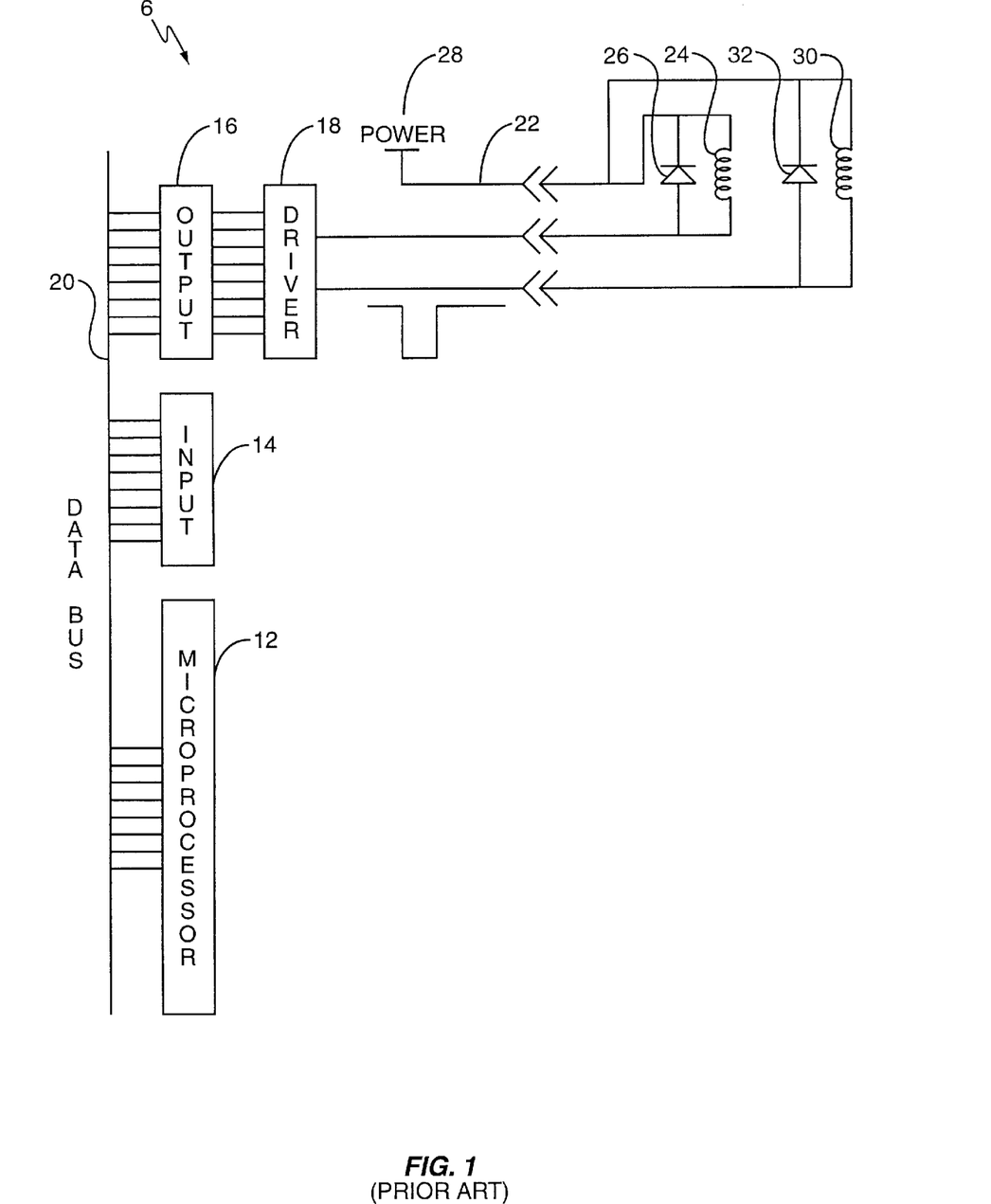
FIG. 1 is a circuit diagram of a totalizer control circuit according to the prior art.

As previously stated, the totalizer is typically an electromechanical device which is operated by a solenoid. In modern fuel dispensers, the solenoid is microprocessor controlled as is virtually all other aspects of fuel dispenser operation. The microprocessor will receive an input from a fuel metering device and will then in turn instruct the solenoid to advance the counter one unit. Therefore, for every unit dispensed, the solenoid is activated to advance a counter. The solenoid, being a coil of wire surrounding a magnet will emit a magnetic pulse each time it is energized for advancing the counter. Therefore, for each unit dispensed, an electromagnetic pulse will be emitted from the solenoid operating the counter. As may be expected, if multiple products are collectively arranged, there will be a totalizer for each product and a corresponding magnetic pulse for each unit of fuel dispensed by each product. This circuit arrangement is illustrated in FIG. 1.

Figure 2:
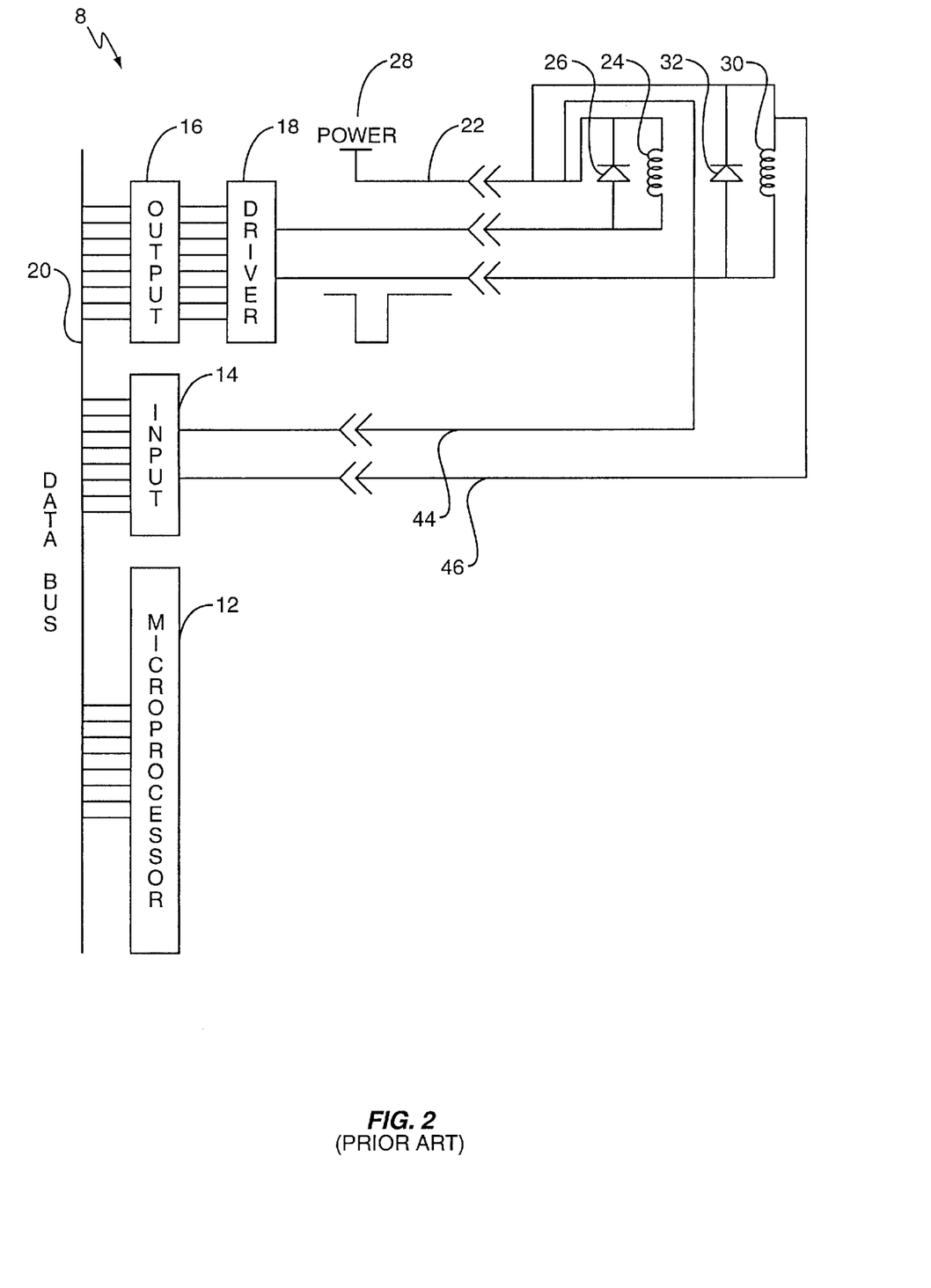
FIG. 2 is a circuit diagram of the totalizer control circuit including a prior art failure detection circuit.

A current, common method of detecting tampering with a totalizer involves detecting when the counter is actually disconnected. This circuit arrangment is illustrated in FIG. 2. There, a connection to ground or power is sent out to each counter and then looped back to the microprocessor input port through lines 44,46. There may be one signal for each totalizer, as illustrated in FIG. 2, or all the totalizers may be wired together. The microprocessor monitors the input port as long as the input is of the proper polarity, it assumes that the counter is functioning properly. Thus, the microprocessor has no way of knowing if the solenoid was activated, if the counter solenoid is operational or if the wires to the coil have been disconnected. All that can be determined is whether power is available. As may be expected, this method does not completely allow the determination of whether the counter is operational.

SUMMARY OF THE INVENTION

It is accordingly an objective of the present invention to provide an electric circuit to prevent tampering with a totalizer by determining whether the counter solenoid has been activated.

It is another objective of the present invention to provide an electric circuit which ensures that the totalizer circuitry has not failed.

To that end, an apparatus to detect tampering with a totalizing device on a fuel dispenser, the totalizing device acting to keep a running total of fuel dispensed from the fuel dispenser and including an electric circuit containing at least one coil that will emit a magnetic pulse responsive to a conditioning consistent with proper totalizer operation includes an arrangement for sensing the presence of the magnetic pulse associated with the electrical circuit and generating a signal responsive thereto and an arrangement in communication with the arrangement for sensing the presence of the magnetic pulse for causing an alarm responsive to absence of the magnetic pulse. It is preferred that the arrangement for sensing the presence of the magnetic pulse and generating a signal responsive thereto includes a magnetic sensitive device. It is further preferred that the arrangement for causing an alarm responsive in the absence of the magnetic pulse include an electric alarm circuit.

Preferably, the magnetic sensitive device includes a reed switch. Optionally, the magnetic sensitive device may include a solid state magnetic proximity sensor. It is further preferred that the totalizer be controlled by an electric controller circuit. and the alarm circuit produces an alarm signal directed to the controller circuit. Further, the controller circuit controls operation of the fuel dispenser responsive to the condition of the alarm signal. Preferably, the control circuit and the alarm circuit are included within a preprogrammed microprocessor and the magnetic sensitive device directs the signal to the microprocessor. The microprocessor controls operation of the fuel dispenser responsive to an absence of the signal from the magnetic sensitive device.

Preferably, the apparatus to detect tampering with a totalizing device on a fuel dispenser includes an electric circuit containing at least one coil that will emit a magnet pulse responsive to the condition with the proper operation of the totalizing device, a microprocessor containing an alarm software and a control software, an input buffer, an output buffer, and a magnetic sensitive device in electric communication with the input buffer for sensing the presence of the magnetic pulse wherein the input buffer electronically communications with the alarm software, the alarm software communicates with the control software, and the control software electronically communicates with the output buffer and the output buffer disables the fuel dispenser responsive to an absence of the magnetic pulse. Preferably, the magnetic sensitive device is a reed switch. Alternately, a solid state magnetic proximity sensor may function as the magnetic sensitive device.

The present invention further includes a method for detecting tampering with a totalizer device on a fuel dispenser including the steps of detecting a magnetic field in an electric circuit containing at least one coil that will emit a magnetic pulse responsive to a condition consistent with proper operation of the totalizing device, sending a signal responsive to the condition of the magnetic field to an input buffer, sending the signal from the input buffer to a microprocessor containing an alarm software and a control software, directing the signal from the microprocessor to the alarm software, detecting whether the magnetic field is present in the electric signal from the signal using the alarm software, sending an alarm response to the control software indicative of the signal using the alarm software, sending a control response to the output buffer using the control software, and disabling the fuel dispenser using the output buffer if the control response is indicative of the absence of the magnetic field. Preferably, the step of detecting a magnetic field is accomplished with a device consisting of a magnetic sensitive device as described above.

By the above, the present invention provides a simple and reliable method for insuring proper totalizer operation by monitoring the final condition required for totalizer counter advancement.

DESCRIPTION OF THE PREFERRED EMBODIMENT

Turning now to the drawings, and more particularly to FIG. 1, a totalizer control circuit according to the prior art is disclosed generally at 6 and includes a microprocessor 12, an input buffer 14, and an output buffer 16 all interconnected using a data bus 20. It should be understood that while the drawings depict the circuit in a very simple manner, other components are required to control a fuel dispenser and these will be apparent to those skilled in the art of fuel dispenser construction and control. The output buffer 16 is connected to a driver 18 which acts to drive the electromechanical counter. Each counter (not shown) is driven by a solenoid depicted as a coil 24,30 in series with the driver 18 and the power source 28 through wiring 22. FIG. 1 depicts a two counter operation with the counters being in parallel. A diode 26,32 is disposed in parallel with each coil 24,30 to dissipate the coil energy after the driver is turned off.

Turning now to FIG. 2, a prior art circuit is illustrated generally at 8 which depicts the previous approach to totalizer security using a method that detects whether the totalizer is energized. There, the solenoid power source 28 is connected to the input buffer 14 by wires 44,46, with each wire 44,46 being in parallel with each coil 24,30. Using this construction, the input buffer 14 realizes when power has failed along line 22 indicating a power failure to the totalizer coils 24,30. Someone seeking to circumvent the totalizer could merely open the circuit intermediate to coils 24,30 and the junction between the power wire 22 and the parallel security lines 44,46 which would indicate that power was available to the totalizer while disabling the totalizer.

Figure 3:
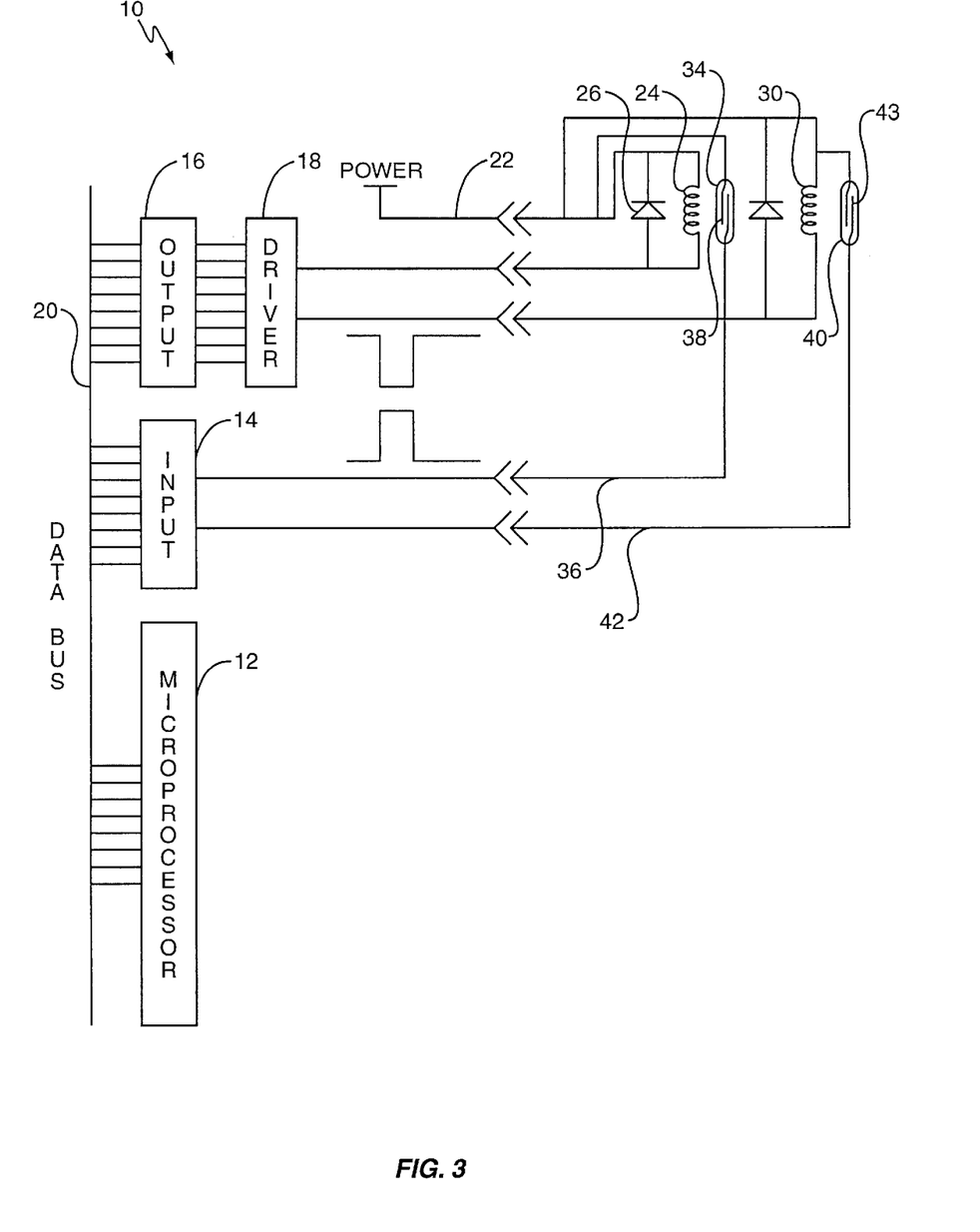
FIG. 3 is a circuit diagram of a totalizer control circuit equipped with an apparatus to detect tampering with a fuel dispenser totalizer according to one preferred embodiment of the present invention.

The present invention addresses this problem by monitoring the operation of the totalizer itself by determining whether the coils 24,30 have, in actuality, been energized. As depicted in FIG. 3, a magnetic sensitive device 34,40 is placed in close proximity to each of the coils 24,30 and wired in parallel therewith using lines 38,42. It should be noted that the similarity between FIG. 2 and FIG. 3 with regard to the security wiring is depicted only as a matter of convenience, in fact, and with reference to FIG. 2, the security wiring 44,46 will likely not be in close proximity to the coils 24,30. However, and with reference to FIG. 3, the magnetic sensitive device must be in close proximity to the coils 24,30 so as to receive the effect of the magnetic pulse generated thereby upon being energized.

It will be appreciated that there are several magnetic sensitive devices which can function with the present invention. FIG. 3 depicts a common reed switch which typically consists of two flat contact tongues 38,43 which are disposed adjacent one another and a glass tube filled with protective gas. Upon contact with a magnetic field, the overlapping contact tongues 38,43 attract one another and spring into contact. When the magnetic field is removed, the contact tongues demagnetize immediately and return to their rest positions rapidly. Since the air gap between the contact tongues is only on the order of 0.1 to 0.3 millimeters and the mass of the contact tongues is low, the opening and closing of the reed switch is virtually instantaneous. Therefore, when the coils 24,30 are energized, the reed switch 34,40 receives the magnetic pulse, closing contact tongues 38,43 to place power on lines 36,42 which is received by the input buffer 14. The duration of the signal from the reed switch 34,40 is essentially the same as the duration of the magnetic pulse emitted from the coils 24,30 and is felt by the input buffer 14 virtually instantaneously as the signal is emitted from the driver 18. If the expected signal is not present, the microprocessor 12 will act to disable the fuel dispenser until the source of the problem is corrected.

Figure 4:
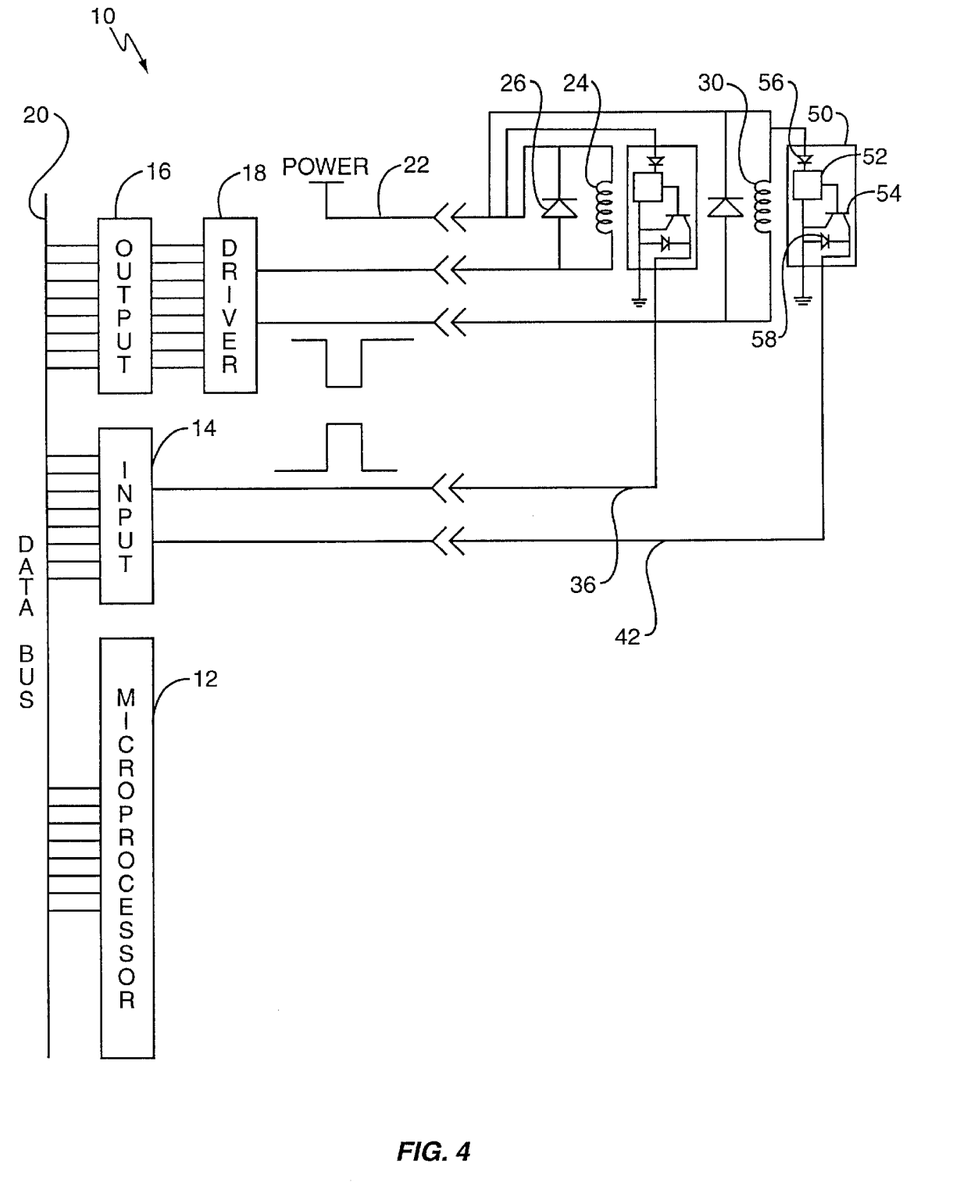
FIG. 4 is a circuit diagram of a totalizer control circuit equipped with an apparatus to detect tampering with a fuel dispenser totalizer according to a second preferred embodiment of the present invention.

Another preferred embodiment of the present invention is depicted in FIG. 4. There, the magnetic sensitive device is a solid state magnetic proximity sensor 50 which internally includes a sensing circuit 52, having a blocking diode 56 in series therewith. The signal from the sensing circuit is amplified using a transistor 54 having a zenor diode 58 in parallel therewith. This circuit is typical of a magnetic proximity sensor such as those available from ALEPH as part numbers MS-1000, MS-2000, MS-3000, MS-4000, or MS-5000. Operation of this circuit is essentially the same as the circuit depicted in FIG. 3.

Figure 5:
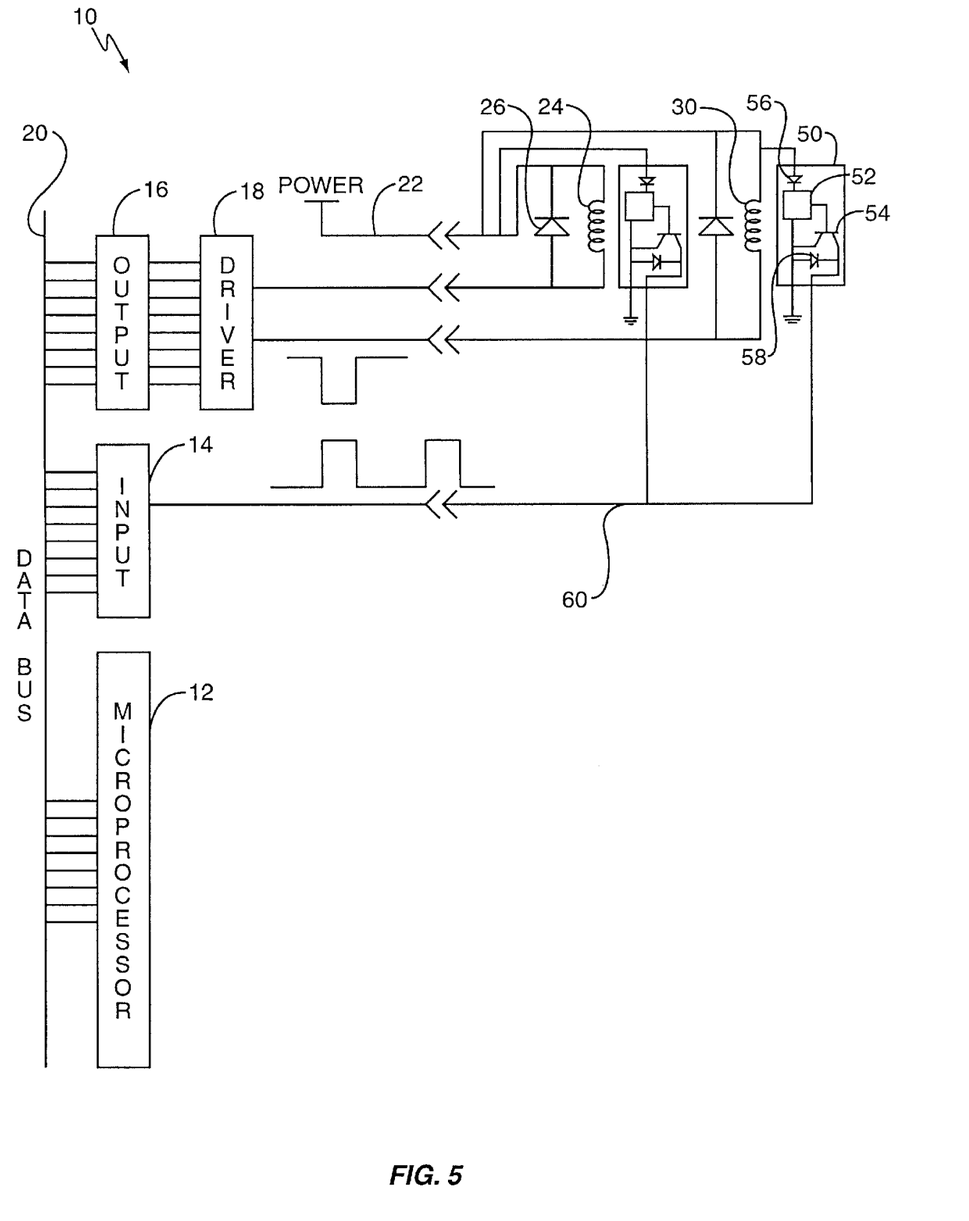
FIG. 5 is a totalizer control circuit equipped with an apparatus to detect tampering with a fuel dispenser totalizer according to a third preferred embodiment of the present invention.

Another preferred embodiment is depicted in FIG. 5. There, the output of the magnetic sensors 50 is linked to the input buffer 14 using a common line such that the magnetic proximity sensors 50 are in parallel on the same circuit. In this case, the microprocessor 12 will be programmed to receive a series of coordinated pulses from each totalizer security circuit.

Figure 6:
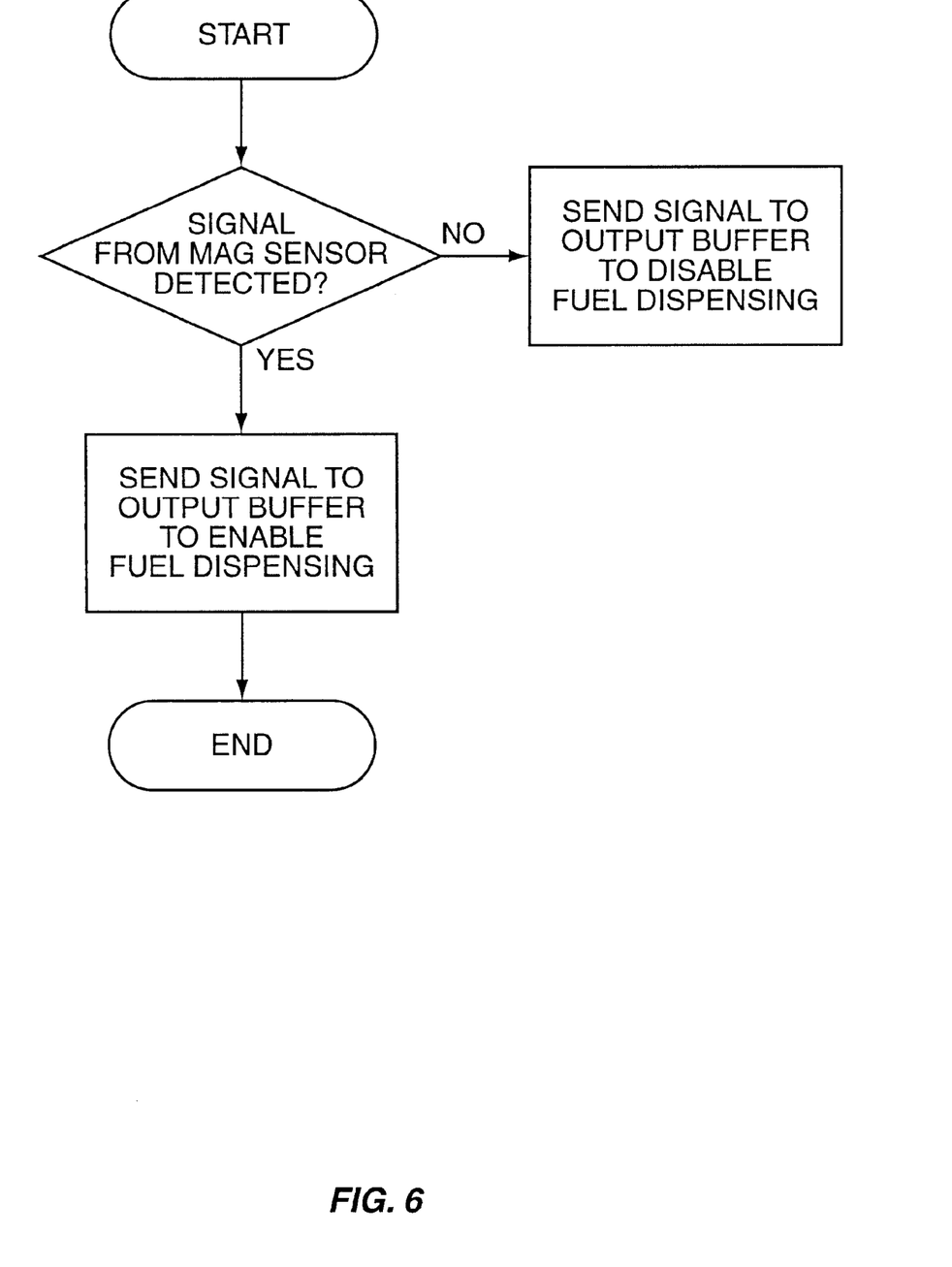
FIG. 6 is a flow chart illustrating the task undertaken by the microprocessor in accordance with the present invention.

In operation, and according to the method of the present invention, the driver 18 will transmit a signal to the coils 24,30 for advancing the counter one unit. The coils 24,30 will then emit the magnetic pulse which is sensed by the magnetic sensitive device 34,43,50 which places a signal on the return line 36,42,60 which is sensed by the input buffer 14. The microprocessor at this time will have a task, or program, running in a periodic fashion that will determine if the signal on the input buffer 14 entering the microprocessor is indicative of the absence of a signal from the magnetic sensing device 34,43,50. When this task runs, it looks to see if the signal is present. if the signal is present, the microprocessor sends a signal to the output port of the microprocessor which is ultimately directed to the output buffer to enable fuel dispensing. If the signal is not present, the microprocessor sends a signal to the output port of the microprocessor and, ultimately, to the output buffer to disable fuel dispensing. This task is shown in a basic form in FIG. 6. The microprocessor expects the pulse at virtually the same time that it sends the pulse to the coils 24,30. If there is a corresponding input pulse for each output pulse, then the microprocessor realizes that a pulse was sent to the counter, that the counter coil is operational, and that the wires to the coil have not been disconnected. Therefore, the proper totalizer operation is ensured. Another feature of the present invention is that it gives a means to test whether the totalizer circuitry has failed. If a coil 24,30 opens or shorts or the drive circuitry opens or shorts, the magnetic sensor 34,43,50 will act in an abnormal way, either not activating in the case of an open circuit or remaining activated in the case of a short circuit, which will be detected by the microprocessor 12. The effected fuel dispenser can then be deactivated until the problem is solved.

By the above, the present invention provides a simple and effective method to determine whether a totalizer associated with a fuel dispenser has either been tampered with or failed.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An apparatus to detect tampering in a fuel dispenser comprising a totalizer for keeping a running total of fuel dispensed through said fuel dispenser and a control means for receiving a fuel metering signal related to an amount of fuel being dispensed and providing an input drive signal to said totalizer based on the fuel metering signal to cause said totalizer to increase its running total and for sensing a feedback signal from said totalizer consistent with proper totalizer operation and for causing an alarm responsive to absence of the feedback signal, said totalizer containing an electric circuit containing at least one coil that will emit a magnetic pulse responsive to the input drive signal and means associated with said control means for sensing the magnetic pulse to produce the feedback signal.

2. The apparatus according to claim 1 wherein said means for sensing the presence of the magnetic pulse to produce the feedback signal includes a magnetic sensitive device.

3. The apparatus according to claim 2 wherein said means for causing an alarm responsive to the absence of the feedback signal includes an electric alarm circuit.

4. The apparatus according to claim 2 wherein said magnetic sensitive device includes a reed switch.

5. The apparatus according to claim 2 wherein said magnetic sensitive device includes a solid state magnetic proximity sensor.

6. The apparatus according to claim 1 wherein said control means includes an electric controller circuit for controlling said totalizing device and an alarm circuit for producing an alarm signal directed to said controller circuit.

7. The apparatus according to claim 6 wherein said controller circuit controls operation of the fuel dispenser responsive to the condition of said alarm signal.

8. The apparatus according to claim 6 wherein said controller circuit and said alarm circuit are included within a preprogrammed microprocessor and said magnetic sensitive device directs said signal to said microprocessor.

9. The apparatus according to claim 8 wherein said microprocessor controls the operation of the fuel dispenser responsive to an absence of the feedback signal from said means for sensing the presence of the magnetic pulse.

10. An apparatus to detect tampering with a totalizing device on a fuel dispenser, the totalizing device acting to keep a running total of fuel dispensed from the fuel dispenser and including an electric circuit containing at least one coil that will emit a magnetic pulse responsive to an input drive signal and a magnetic sensitive device responsive to the magnetic pulse to produce an output feedback signal, said apparatus comprising a control circuit and an alarm circuit within a preprogrammed microprocessor with said alarm circuit for sensing the presence of the feedback signal and generating a signal responsive thereto and directing said signal to said control circuit with said microprocessor disabling the fuel dispenser responsive to an absence of said feedback signal from said magnetic sensitive device.

11. The apparatus according to claim 10 wherein said magnetic sensitive device includes a reed switch in electrical communication with said alarm circuit.

12. The apparatus according to claim 10 wherein said magnetic sensitive device includes a solid state magnetic proximity sensor in electrical communication with said alarm circuit.

13. An apparatus to detect tampering with a totalizing device on a fuel dispenser, comprising:

an electric circuit disposed within said totalizing device containing at least one coil that will emit a magnetic pulse responsive to an input drive signal, the magnetic pulse being consistent with proper operation of the totalizing device;

a microprocessor containing an alarm software and a control software;

an input buffer;

an output buffer; and a magnetic sensitive device disposed within said totalizing device in electrical communication with said input buffer for sensing the presence of the magnetic pulse to produce a feedback signal wherein said input buffer electronically communicates with said alarm software, said alarm software communicates with said control software, and said control software electronically communicates with said output buffer, and said output buffer disables the fuel dispenser responsive to an absence of said feedback signal.

14. The apparatus according to claim 13 wherein said magnetic sensitive device includes a reed switch.

15. The apparatus according to claim 13 wherein said magnetic sensitive device includes a solid state magnetic proximity sensor.

16. A method of detecting tampering with a totalizing device on a fuel dispenser, comprising the steps of:

detecting a magnetic field in an electric circuit containing at least one coil that will emit a magnetic pulse responsive to an input drive signal, with the magnetic pulse being consistent with proper operation of the totalizing device;

sending a feedback signal responsive to a condition of said magnetic field to an input buffer;

sending said feedback signal from said input buffer to a microprocessor containing an alarm software and a control software;

processing said feedback signal in said microprocessor using said alarm software;

detecting whether said magnetic field is present in said electric circuit from said feedback signal using said alarm software;

sending an alarm response to said control software indicative of said feedback signal using said alarm software;

sending a control response to said output buffer using said control software; and disabling the fuel dispenser using said output buffer if said control response is indicative of the absence of said magnetic field as indicated by said feedback signal.

17. The method according to claim 16 wherein the step of detecting a magnetic field is accomplished with a device consisting of a magnetic sensitive device.

18. A fuel dispenser comprising:

a fuel metering device adapted to produce a metering signal based on the amount of fuel being dispensed in a given fueling transaction;

a totalizer adapted to accumulate a running volume of dispensed fuel across a plurality of fueling transactions based on an input drive signal and to produce a feedback signal in response to the input drive signal; and a control circuit operatively associated with said fuel metering device and said totalizer and adapted to generate the input drive signal to said totalizer based on monitoring the metering signal produced by said fuel metering device and to generate an alarm signal if the feedback signal from said totalizer is not present.

19. The fuel dispenser of claim 18 wherein the input drive signal to said totalizer is dynamic and synchronous with the fuel metering signal monitored by said control circuit and the feedback signal from said totalizer is dynamic and synchronous with the input drive signal.

20. The fuel dispenser of claim 18 wherein the input drive signal to said totalizer comprises a series of input electrical pulses and the totalizer is adapted to produce a series of magnetic pulses corresponding the input electrical pulses, with the series of magnetic pulses causing said totalizer to accumulate running volume.

21. The fuel dispenser of claim 20 wherein said totalizer further includes magnetic sensors responsive to the series of magnetic pulses and adapted to produce the feedback signal output to said control circuit.

22. The fuel dispenser of claim 21 wherein said magnetic sensors are magnetic reed switches.

23. The fuel dispenser of claim 21 wherein said magnetic sensors are solid-state magnetic proximity sensors.

24. The fuel dispenser of claim 18 wherein said control circuit monitors for the presence of the feedback signal during dispensing operations and disables fuel dispensing from said fuel dispenser and generates the alarm signal if the feedback signal is not present.

25. The fuel dispenser of claim 18 wherein said control circuit comprises a microcontroller executing a stored program and a microcontroller interface circuit providing connection with said fuel metering device and said totalizer.

26. A method to detect tampering with a totalizer in a fuel dispenser comprising the steps of:

receiving a fuel metering signal related to an amount of fuel being dispensed;

sending an input drive signal to said totalizer based on the fuel metering signal to cause said totalizer to accumulate running volume;

receiving an output feedback signal from said totalizer responsive to the input drive signal and indicative of proper totalizer operation;

verifying that the output feedback signal is responsive to the input drive signal; and generating an alarm signal if the output feedback signal is not responsive to the input drive signal.

27. The method of claim 26 further comprising the step of disabling fuel dispensing operations from said fuel dispenser if the output feedback signal is not responsive to the input drive signal.

28. The method of claim 27 wherein the input drive signal comprises a series of electrical pulses and said totalizer is adapted to generate a corresponding series of magnetic pulses based on the series of electrical pulses and accumulate running volume based on the magnetic pulses.

29. The method of claim 28 wherein said totalizer includes magnetic sensors responsive to the series of magnetic pulses and adapted to produce the feedback signal based on the series of magnetic pulses.

* * * * *